United States Patent
Schlagintweit

(10) Patent No.: US 7,406,099 B2
(45) Date of Patent: Jul. 29, 2008

(54) SYSTEM FOR VOICE AND DATA COMMUNICATION VIA A COMMON SUBSCRIBER LINE

(75) Inventor: Martin Schlagintweit, Zorneding (DE)

(73) Assignee: Siemens Aktiengesellschaft, Munich (DE)

( * ) Notice: Subject to any disclaimer, the term of this patent is extended or adjusted under 35 U.S.C. 154(b) by 881 days.

(21) Appl. No.: 10/653,467

(22) Filed: Sep. 3, 2003

(65) Prior Publication Data

US 2004/0101115 A1 May 27, 2004

(30) Foreign Application Priority Data

Sep. 3, 2002 (DE) .............................. 102 40 651

(51) Int. Cl.
H04J 1/02 (2006.01)
(52) U.S. Cl. ...................................... 370/493; 370/468
(58) Field of Classification Search ................. 370/465, 370/466, 468, 469, 480, 485–488, 493–495, 370/497; 379/399.01–413.04
See application file for complete search history.

(56) References Cited

U.S. PATENT DOCUMENTS

| | | | | |
|---|---|---|---|---|
| 5,459,729 A | * | 10/1995 | Bliven | 370/465 |
| 5,541,982 A | * | 7/1996 | Bergler | 379/93.06 |
| 5,598,413 A | * | 1/1997 | Sansom et al. | 370/468 |
| 5,896,390 A | * | 4/1999 | Williams | 370/466 |
| 5,991,311 A | | 11/1999 | Long et al. | |
| 5,999,542 A | * | 12/1999 | Turner et al. | 370/497 |
| 6,118,365 A | * | 9/2000 | Petzold et al. | 336/221 |
| 6,272,219 B1 | * | 8/2001 | De Bruycker et al. | 379/399.01 |
| 6,282,204 B1 | * | 8/2001 | Balatoni et al. | 370/421 |
| 6,693,916 B1 | * | 2/2004 | Chaplik et al. | 370/485 |
| 7,039,180 B1 | * | 5/2006 | Issaa et al. | 379/399.01 |
| 7,088,709 B1 | * | 8/2006 | Brieskorn | 370/357 |

(Continued)

FOREIGN PATENT DOCUMENTS

DE 19933264 A1 1/2001

(Continued)

OTHER PUBLICATIONS

Kessler et al., "Simulation of ADSL over ISDN on German Subscriber Lines", IEEE Communications Letters, vol. 1, No. 5, Sep. 1997, pp. 124-126.

(Continued)

Primary Examiner—Chi H. Pham
Assistant Examiner—Kevin Mew
(74) Attorney, Agent, or Firm—Staas & Halsey LLP

(57) ABSTRACT

A data coding device for coding data, to be transmitted as part of data communication, to signals of a first frequency range, not used for voice communication with a first set of performance features, and a conversion device are provided. The conversion device has an interface for connecting a voice terminal having a second set of performace features and for transmission of data coded to signals of a second frequency range that are to be transmitted with the second set of performance features as part of voice communication. The conversion device also has a coding means for recording signals of the second frequency range to signals of a third frequency range that is located outside the first frequency range. Furthermore, a frequency-separating filter for feeding signals of the first and third frequency range into the subscriber line is provided.

14 Claims, 1 Drawing Sheet

U.S. PATENT DOCUMENTS

2002/0101882 A1* 8/2002 Kim .......................... 370/480
2006/0274668 A1* 12/2006 Frankiln et al. ............. 370/252

FOREIGN PATENT DOCUMENTS

| DE | 199 63 247 | 7/2001 |
| --- | --- | --- |
| WO | WO99/51019 | 10/1999 |
| WO | WO01/10166 A1 | 2/2001 |

OTHER PUBLICATIONS

Batruni et al., "WPM2.1: Mixed Digital/Analog Signal Processing for a Single-Chip 281Q U Interface Transceiver", Session 2: Telecommunication Circuits, ISSCC 90/Wednesday, Feb. 14, 1999, Continental Ballroom 1-4, 1:30pm, IEEE International Solid-State Circuits Conference, pp. 26-27 and 256.

Search Report issued in corresponding European Patent Application No. 03102479.7, on Dec. 27, 2007.

* cited by examiner

SYSTEM FOR VOICE AND DATA COMMUNICATION VIA A COMMON SUBSCRIBER LINE

CROSS REFERENCE TO RELATED APPLICATIONS

This application is based on and hereby claims priority to German Application No. 102 40 651.0, the contents of which are hereby incorporated by reference.

BACKGROUND OF THE INVENTION

Subscriber lines of public or private communication networks provided for voice communication are increasingly being used also for data communication. Known examples of these are the transmission technologies summarized under the code xDSL (x Digital Subscriber Line), that permit very high data transmission rates. Widespread xDSL technologies are, for example, ADSL (Asynchronous Digital Subscriber Line), HDSL (High Bit Rate Digital Subscriber Line), VHDSL (Very High Bit Rate Digital Subscriber Line), VADSL (Very High Bit Rate Asymmetrical Digital Subscriber Line) or SDSL (Symmetric Digital Subscriber Line).

With the ADSL-Over-ISDN technologies, as they are known, that are widespread in public communication networks, a frequency range of 162-1102 kHz that can still be physically transmitted via the subscriber line is used for data transmission, in addition to a 0-120 kHz frequency range for an ISDN basic access reserved for voice communication. Because the given frequency ranges are disjunctive, voice and data can be transmitted independently and parallel to each other via a common subscriber line. For this purpose, voice terminals and data terminals are coupled via a frequency-separating filter, often known as a splitter, to the common subscriber line. A particular voice terminal is in this case connected via a $S_0$ or a $U_{K0}$ interface to the splitter.

Because, however, the ADSL-Over-ISDN technology is essentially designed for public communication networks and their subscriber lines and voice terminals, the set of performance features for voice terminals is substantially limited.

SUMMARY OF THE INVENTION

One possible object of this invention is to provide a system for voice and data communication via a common subscriber line, that, compared to the ADSL-Over-ISDN technology enables the set of performance features that is available for voice terminals to be expanded.

For voice and data communication via a common subscriber line, a data coding device is provided for coding data to be transmitted as part of data communication into signals of a first frequency range not used for voice communication with a first set of performance features, and also a conversion device is provided. The conversion device has an interface for connecting a voice terminal with a second set of performance features and for transmission of data coded as signals of a second frequency range that are to be transmitted in the course of voice communications with the second set of performance features. The conversion device also has a coding device for recoding the signals of the second frequency range into signals of a third frequency range outside the first frequency range. Furthermore, a frequency-separating filter is provided for feeding the signals of the first and third frequency range into the subscriber line.

A possible advantage is that standard xDSL technology can also be used in private communication networks with a second set of performance features expanded compared to public networks. Suitable voice terminals with expanded set of performance features usually have a connecting interface the signal frequency range of which overlaps with the first frequency range used for data transmission. With the system, the signals transmitted via this interface are converted to signals of a third frequency range outside the first frequency range and can thus be transmitted jointly with the signals used for data communication via the subscriber line without mutual interference.

In this way, an expanded set of performance features of modern private exchange equipment can also be used in the context of standard xDSL technologies designed for public communication networks.

A further possible advantage is that the existing voice terminals and existing xDSL assemblies can be used for this purpose.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
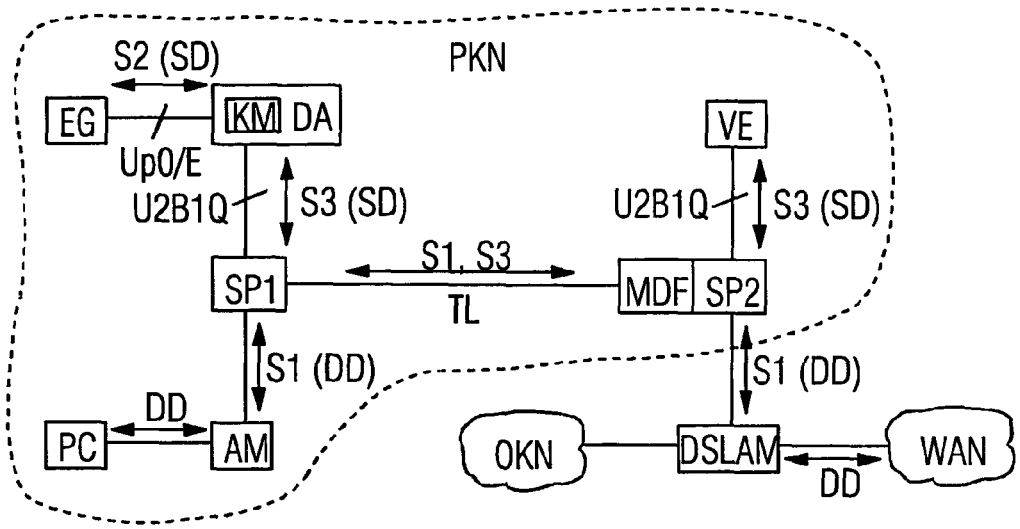
FIG. 1 is a communication system for voice and data communication via a common subscriber line.

Reference will now be made in detail to the preferred embodiments of the present invention, examples of which are illustrated in the accompanying drawings, wherein like reference numerals refer to like elements throughout.

FIG. 1 is a schematic illustration of a communication system for voice and data communication via a common subscriber line TL. The subscriber line TL is preferably a copper twin-wire cable such as is frequently used for connecting subscriber terminals to public communication networks. The communication system has a private communication network PKN shown by a dotted line, a public communication network OKN, e.g. a public telephone network, and a wide area network WAN based on an internet protocol, such as the Internet.

Compared with the set of performance features, referred to in the following as a first set of performance features, available in the public communication network OKN, the private communication network PKN has an expanded set of performance features, referred to in the following as a second set of performance features.

The private communication network PKN in the present exemplary embodiment has, as communication equipment, a voice terminal EG for voice communication supporting the second set of performance features, exchange equipment VE supporting the second set of performance features and a personal computer PC for data transmission. The voice terminal EG has a $U_{PO/E}$ interface through which it is connected to a converter device DA. In addition to the $U_{PO/E}$ interface the conversion device DA has a U2B1Q interface and a coding device KM for converting the protocol and for signal recoding between the $U_{PO/E}$ and U2B1Q interface. The conversion device DA is connected to a frequency-separating filter SP1 via the U2B1Q interface. In this exemplary embodiment, the frequency-separating filter SP1 is a standard ADSL frequency-separating filter, called a splitter.

The personal computer PC is connected to the frequency-separating filter SP1 by an ADSL modem AM that acts as a data encoder and data decoder.

The frequency separating filter SP1 is connected via the subscriber line TL to a main distributor MDF (MDF: Main Distribution Frame) of the private communication network PKN. A further frequency-separating filter SP2, in the form of an ADSL splitter, is coupled to the main distributor MDF. The frequency-separating filter SP2 is connected via a U2B1Q interface to the exchange equipment VE. If the exchange equipment VE does not have a U2B1Q interface, a further conversion device (not illustrated) for protocol conversion can be connected between the exchange equipment VE and the frequency-separating filter SP2.

The frequency-separating filter SP2 is also connected to a DSL multiplexer DSLAM (Digital Subscriber Line Access Multiplexer), to which the public communication network OKN and the wide area network WAN are also connected. The DSL multiplexer DSLAM serves to combine several ADSL lines and also for connection to forwarding data transmission equipment, such as an ATM switch (ATM: Asynchronous Transfer Mode). In the present exemplary embodiment, the DSL multiplexer DSLAM combines ADSL lines from the private communication network PKN and the public communication network OKN and forwards the data transported through these into the wide area network WAN.

In the following, let us assume data transmission between the personal computer PC and wide area network WAN and also a voice connection between the terminal EG and the exchange equipment VE, with the voice connection and the data transmission being jointly carried on the subscriber line TL.

As part of the data transmission, data DD, preferably in the form of data packets based on the Internet protocol, is transmitted from the personal computer PC to the ADSL modem AM. This codes the data DD into ADSL signals S1 that are forwarded to the frequency-separating filter SP1. The ADSL signals S1 are transmitted in a first frequency range FB1 of 162 kHz to 1102 kHz provided for ADSL data transmission.

Figure 2:
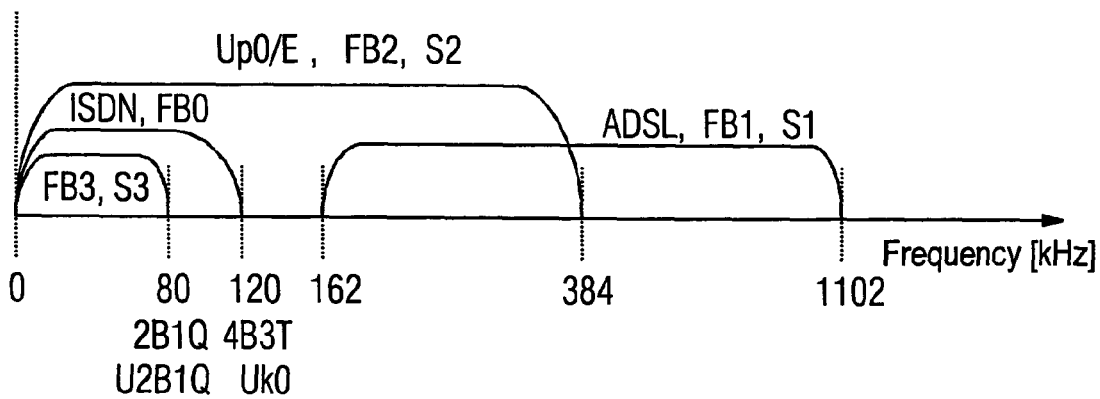
FIG. 2 is a frequency diagram to indicate the frequency ranges used for voice and data communication.

The frequency diagram shown in FIG. 2 shows the first frequency range FB1 reserved for ADSL data transmission, in relation to the other frequency ranges relevant for this exemplary embodiment. As FIG. 2 shows, the first frequency range FB1 reserves (excludes) that frequency range FB0 that in public communication networks is reserved for ISDN connections with the first set of performance features that is normal in that network. In the case of ISDN connections via a $U_{k0}$ line interface with 4B3T coding, this is, for example, the 0-120 kHz frequency range. Otherwise, the first frequency range FB1 would largely exhaust the transmission bandwidth physically available for average subscriber lines. This type of ADSL data transmission is frequently called ADSL-Over-ISDN. Correspondingly, standard equipment preferably designed for ADSL-Over-ISDN is to be used as the ADSL modem AM and the frequency-separating filter SP1.

As part of the voice connection between the terminal EG and exchange equipment VE using the second set of performance features, voice communication data SD is communicated from the terminal EG to the conversion device DA. The voice communication data SD usually includes both pure voice data and also signaling information.

The voice communication data SD is transmitted in the form of electrical signals S2 via the $U_{pO/E}$ interface. The signals S2, as shown in FIG. 2, occupy a second frequency range FB2 of 0-384 kHz that overlaps with the first frequency range FB1. The second frequency range FB2 is broader than the frequency range FB0 normally reserved for ISDN voice communication in public communication networks, because the expanded second set of performance features of the private communication network PKN requires higher data transmission rates, e.g. for voice and signaling data, than a public communication network.

The signals S2 transmitted to the conversion device DA are recoded by the coding device KM into electrical signals S3 with the information being retained. The signals S3 occupy a third frequency range FB3 that is narrower than the second frequency range FB2. In the example given here, the signals S3 have a 2B1Q coding with a signal frequency range of 0-80 kHz as a third frequency range FB3. The 2B1Q coding requires a lower separating bandwidth than the coding of the signals S2 for the same data transmission range. FIG. 2 shows the third frequency range FB3 occupied by signals S3 compared to the other aforementioned frequency ranges FB1, FB2 and FB0.

Due to the narrowing of the bandwidth by the conversion device DA, the third frequency range FB3 is completely below the first frequency range FB1 reserved for ADSL data transmission and thus does not overlap with the first frequency range FB1.

The signals S3 coding the voice communication data SD are transmitted from the conversion device DA via the interface U2B1Q provided for the 2B1Q coding to the frequency-separating filter SP1. The frequency-separating filter SB1 feeds the signals S3 of the third frequency range FB3 received from the conversion device DA, and also the signals S1 of the first frequency range FB1 received from the ADSL modem AM, into the subscriber line TL. Because the first and third frequency ranges do not overlap, the signals S1 and S3 or the data DD and SD transmitted by them, can be transmitted to the frequency separating filter SP2 in parallel and without mutual interference via the subscriber line TL and the main distributor MDF.

The frequency-separating filter SP2 separates the first and third frequency ranges again from each other and correspondingly transmits signals S3 coding the voice communication data SD to the exchange equipment VE and signals S1 coding the data DD to the DSM multiplexer DSLAM. Finally, the voice communication data SD is forwarded from the exchange equipment VE, and the data DD from the DSL multiplexer DSLAM, to the wide area network WAN.

For reasons of clarity, only one direction of transmission, i.e. from terminal EG in the direction of the exchange equipment VE or from the personal computer PC in the direction of the wide area network WAN, was considered here. The examples here can, however, be used in a similar manner for voice or data transmission in the reverse direction, i.e. from the exchange equipment VE to terminal EG or from the wide area network WAN to the personal computer PC. In this case, the frequency-separating filter SP2 feeds signals S3 of the third frequency range FB3 originating from the exchange equipment VE, and signals S1 of the first frequency range FB1 originating from the DSL multiplexer DSLAM, into the subscriber line TL. The fed-in signals S1 and S3 are then separated again by the frequency-separating filter SP1, with signals S1 being communicated to the ADSL modem AM and signals S3 being sent to the conversion device DA. Whereas the ADSL modem AM extracts the data DD transported in signals S1 and transmits it to the person computer PC, the coding device KM recodes the signal S3 into signals S2 of the second frequency range FB2. Signals S2 containing the voice communication data SD are finally transmitted from the conversion device DA via the $U_{pO/E}$ interface to the terminal EG.

Further variants of this exemplary embodiment can be realized in that the Up0/E interface is replaced by a general Up0 interface and/or the U2B1Q interface by the Uk0 interface and/or the ADSL technology by a different xDSL technology.

The invention has been described in detail with particular reference to preferred embodiments thereof and examples, but it will be understood that variations and modifications can be effected within the spirit and scope of the invention.

What is claimed is:

1. A system for voice and data communication via a common subscriber line, comprising:
    a data coding device for coding data relating to the data communication into signals of a first frequency range which is left unused by a voice communication with a first set of performance features;
    a conversion device comprising:
        an interface for connecting to a voice terminal providing a second set of performance features and for transmitting information relating to a voice communication with said second set of performance features, the information being coded into signals of a second frequency range; and
        a recoder to recode the signals of the second frequency range to signals of a third frequency range that is outside the first frequency range; and
    a frequency separating filter to feed signals of the first and third frequency ranges into the subscriber line wherein
    the signals of the first and third frequency ranges are transmitted together with the voice communication with the first set of performance features, on a single transmission line, and
    the signals of the second frequency range are recoded to the signals of the third frequency range while retaining the data transmission rate.

2. The system in accordance with claim 1, wherein
    the data coding device codes data to produce xDSL signals, and
    the frequency-separating filter feeds the xDSL signals into the subscriber line.

3. The system in accordance with claim 1, wherein the second frequency range is a signal frequency range of a $U_{p0/E}$ interface or a $U_{p0}$ interface.

4. The system in accordance with claim 1, wherein the third frequency range is a signal frequency range of a U2B1Q interface or a $U_{k0}$ interface.

5. The system in accordance with claim 1, wherein the conversion device recodes the signals with 2B1Q coding or 4B3T coding.

6. The system in accordance with claim 1, wherein the device has a $U_{p0/E}$ or a $U_{p0}$ interface to connect the voice terminal and a UU2B1Q or a $U_{k0}$ interface for connecting the frequency-separating filter.

7. The system in accordance with claim 1, wherein the subscriber line is a twin-wire cable.

8. The system in accordance with claim 1, wherein the second frequency range overlaps the first and third frequency ranges.

9. The system in accordance with claim 2, wherein the second frequency range is a signal frequency range of a $U_{p0/E}$ interface or a $U_{p0}$ interface.

10. The system in accordance with claim 9, wherein the third frequency range is a signal frequency range of a U2B1Q interface or a $U_{k0}$ interface.

11. The system in accordance with claim 10, wherein the conversion device recodes the signals with 2B1Q coding or 4B3T coding.

12. The system in accordance with claim 11, wherein the conversion device has a $U_{p0/E}$ or a $U_{p0}$ interface to connect the voice terminal and a UU2B1Q or a $U_{k0}$ interface for connecting the frequency-separating filter.

13. The system in accordance with claim 12, wherein the subscriber line is a twin-wire cable.

14. A method for voice communication and data communication via a common subscriber line, comprising:
    coding data relating to the data communication into signals of a first frequency range which is left unused by a voice communication with a first set of performance features;
    receiving information relating to a voice communication with a second set of performance features from a voice terminal providing said second set of performance features, the information being coded into signals of a second frequency range;
    recoding the signals of the second frequency range to signals of a third frequency range being outside of the first frequency range; and feeding the signals of the first and third frequency ranges into the subscriber line; and
    transmittal the signals of the first and third frequency ranges together with the voice communication with the first set of performance features, on a single transmission line;
    wherein the signals of the second frequency range are recorded to the signals of the third frequency range while retaining the data transmission rate.

* * * * *